United States Patent [19]
Erneta

[11] 3,846,453
[45] Nov. 5, 1974

[54] SPHEROIDAL SHAPED PARTICLES OF AMINORESIN-SILICA POLYMERIC COMPOSITE

[75] Inventor: Modesto Erneta, Princeton Junction, N.J.

[73] Assignee: N L Industries, Inc., New York, N.Y.

[22] Filed: May 7, 1973

[21] Appl. No.: 358,046

[52] U.S. Cl. .................. 260/39 SB, 106/308 N
[51] Int. Cl. ............................................. C08g 51/04
[58] Field of Search ............ 260/39 SB; 106/308 N

[56] References Cited
UNITED STATES PATENTS

| | | | |
|---|---|---|---|
| 2,517,261 | 8/1950 | Veitch | 260/39 SB |
| 2,526,684 | 10/1950 | Powers et al. | 260/39 SB |
| 2,760,941 | 8/1956 | Iler | 260/39 SB |
| 2,776,267 | 1/1957 | Weber et al. | 260/39 P |
| 3,251,800 | 5/1966 | Cooley et al. | 260/39 SB |
| 3,714,085 | 1/1973 | Berstein et al. | 260/39 SB |

Primary Examiner—Morris Liebman
Assistant Examiner—S. M. Person

[57] ABSTRACT

Spheroidal shaped particles of aminoresin-silica polymeric composite have been produced which possess an individual particle size range from 0.05 to 0.3 $\mu$. The composite particles contain from 70 percent to 99.5 percent aminoresin, the remainder being silica, the percentages expressed on a weight basis.

These particles are usually aggregated into dense clusters of size from 1 to 10 $\mu$. These composites are useful in films and paper coatings.

11 Claims, No Drawings

SPHEROIDAL SHAPED PARTICLES OF AMINORESIN-SILICA POLYMERIC COMPOSITE

BACKGROUND OF THE INVENTION

Various types of microspheres or microcapsules have been produced for a variety of uses. Among those which are related to the product of the instant invention are urea-formaldehyde microparticles having individual particle sizes ranging from 0.05 to 0.1 $\mu$ which are formed as loosely adherent clusters having a cluster size from 1 to 10 $\mu$ and possessing surface areas up to 300 m$^2$/g. Such products have been suggested for use as opacifying agents for paint, paper and the like. These products have been used with limited success.

SUMMARY OF THE INVENTION

Aminoresin-silica polymeric composite particles have been produced which are spheroidal in shape and possess an individual particle size range from 0.05 to 0.3 $\mu$. The composites contain from 70 to 99.5 percent aminoresin, the remainder being silica. These individual particles are formed into dense clusters having an average cluster size of from 1 to 10 $\mu$.

DESCRIPTION OF THE PREFERRED EMBODIMENTS

The amino resin used in the instant invention include aminoformaldehyde condensation products of urea, melamine, aniline, guanidine, thiourea and mixtures thereof. These aminoresins are formed and polymerized in the presence of polysilicic acid which forms aminoresin-silica compositions upon drying.

In preparing these compositions the following general procedure is employed:

A water soluble silicate solution is prepared which preferably contains from 5 to 30 percent silicate, calculated as $SiO_2$.

An aqueous formaldehyde solution is used which preferably contains from 20 to 50 percent formaldehyde.

An aqueous amino solution is also prepared which contains from 0.5 to 2 moles of the amino or amide for each mole of formaldehyde present in the formaldehyde solution.

The silicate solution, the amino solution and the formaldehyde solution are admixed with rapid agitation. This mixture should contain less than 5 percent sodium silicate by weight.

The mixture is then neutralized by adding an acid to the mixture until the pH falls within the range from 6.5–9.

The neutralized misture is then heated to a temperature from 50°C to boiling for about 4 hours during which time the polymerization takes place. An acidic agent is again added to the mixture to lower the pH to 1–6 and a white voluminous precipitate is formed.

The precipitate is the aminoresin-silica polymeric composite. The amount of silicate employed should be such that there is present from 0.5 to 30 percent silica by weight in the final aminoresin-silica polymeric composite.

In order to describe the instant invention in greater detail, the following examples are presented:

EXAMPLE 1

An amino-resin-silica polymeric composite was prepared as follows:

300 gms of a sodium silicate solution containing 25% $SiO_2$ were mixed with 840 gms of water. The mole ratio of the $SiO_2$ to $Na_2O$ was 3.75.

747 gms of a formaldehyde solution containing 36.5 percent formaldehyde were added to 150 gms of water.

360 gms of urea were mixed with 360 gms of water to form a urea solution.

All of these three solutions were admixed with rapid agitation and the pH of the mixture was lowered to (.) by the addition of concentrated HCl.

The mixture was then heated to 60°C with stirring for 2 hours, after which the temperature was allowed to drop to 25°C. The pH of the mixture was then lowered to 3.5 with addition of 0.36% HCl. The temperature was then raised to 80°C and held at that temperature for 2½ hours during which time a white voluminous precipitate of the polymeric composite was formed. The precipitate was then removed from the liquor by filtration and washing.

Microcapsules having an individual particle size range from 0.1 to 0.2 $\mu$ were produced. These microcapsules formed aggregates of dense clusters which were 1 to 10 $\mu$ in size. These clusters had a surface area of 36.7 m$^2$/g. These microcapsules contained 85 percent urea formaldehyde and 15 percent silica.

The operational details and the results obtained are recorded in the table.

These microcapsules were employed as filler in paper. A standard procedure was used to make a paper sheet containing 5 percent of these microcapsules, plus 5 percent titanium dioxide pigment. The paper sheet was compared to a standard paper sheet containing 10 percent titanium dioxide pigment as the filler. It was found that the bulk density of the paper sheet containing the microcapsules was reduced 24 percent over the bulk density of the paper sheet containing only the titanium dioxide pigment and that only a slight reduction in opacity was obtained.

EXAMPLES 2–4

In these examples the procedure of Example 1 was substantially repeated except that various ratios of urea formaldehyde to silica were used.

The operational details and the results obtained are recorded in the table along with those of Example 1.

EXAMPLES 5–7

The procedure of Example 1 was substantially repeated in these examples except that various amino compounds other than urea were used.

The details also are recorded in the table.

When the microcapsules produced in Examples 2–7 were used in paper in the manner described in Example 1, similar results were obtained.

While this invention has been described and illustrated by the examples shown, it is not intended to be strictly limited thereto, and other variations and modifications may be employed within the scope of the following claims.

TABLE

| Example No. | 1 | 2 | 3 | 4 | 5 | 6 | 7 |
|---|---|---|---|---|---|---|---|
| Ratio of Amino Resin to $SiO_2$ | 85/15 | 95/5 | 90/10 | 80/20 | 95/5 | 95/5 | 95/5 |
| Amt of $Na_2O \cdot 3.75\ SiO_2$ soln containing 25% $SiO_2$, g | 300 | 100 | 200 | 400 | 165 | 135 | 284 |
| Amt of $H_2O$ added to $Na_2O \cdot 3.75\ SiO_2$ soln, g | 840 | 280 | 560 | 2000 | 0 | 0 | 0 |
| Amt of 36.5% Formaldehyde soln, g | 747 | 745 | 745 | 745 | 428 | 642 | 904 |
| Amt of $H_2O$ added to Formaldehyde soln, g | 150 | 150 | 150 | 150 | 0 | 0 | 0 |
| Type of Acid | Conc HCl | 0.36% HCl | 0.36% HCl | 0.36% HCl | 98% $H_2SO_4$ | 10% $H_2SO_4$ | 10% $H_2SO_4$ |
| Adjusted pH | 9 | 7 | 9 | 9 | 8 | 8 | 9 |
| Type of Amino group | Urea | Urea | Urea | Urea | Thiourea | Melamine | Urea/Melamine |
| Amt of Amino group, g | 360 | 360 | 360 | 360 | 304 | 378 | 510/10.7 |
| Amt $H_2O$ added to Amino group, g | 360 | 360 | 360 | 360 | 2000 | 2000 | 3600 |
| Reaction temp, °C | 60 | 70–80 | 80 | 80 | 90 | 50 | 102 |
| Time of reaction, hr | 2 | 1¾ | 2½ | 4 | 4 | 2 | 1½ |
| $H_2O$ addition, g | 0 | 0 | 0 | 2000 | 0 | 0 | 350 |
| Second Acid Addition | 0.36% HCL | 0.36% HCL | 0.36% HCL | 0.36% HCL | 10% $H_2SO_4$ | 10% $H_2SO_4$ | 10% $H_2SO_4$ |
| Adjusted pH | 3.5 | 2.9 | 3.0 | 2.0 | 3 | 5.5 | 3.5 |
| Temperature, °C | 80 | 80 | 75 | 80 | 80 | 70 | Room |
| Reaction time, hr. | 2½ | 3 | ½ | 3 | 1 | ½ | 16 |

I claim:

1. A composition of matter comprising spheroidal shaped clusters of aminoresin-silica polymeric composite particles having an individual particle size range from 0.05 to 0.3 $\mu$, said particles formed into spheroidal shaped clusters of size from 1 to 10 $\mu$, said composition containing from 0.5 to 30 percent silica by weight, the remainder being the aminoresin.

2. Composition according to claim 1 in which the aminoresin is urea formaldehyde.

3. Composition according to claim 1 in which the aminoresin is melamine formaldehyde.

4. Composition according to claim 1 in which the aminoresin is thiourea formaldehyde.

5. Composition according to claim 2 in which the amount of formaldehyde employed is from 0.5 to 2.0 moles for each part of the amino group employed.

6. Process for producing spheroidal shaped clusters of aminoresin silica polymeric composite particles which comprises admixing a solution of an aldehyde, a solution of urea and a water soluble silicate solution, neutralizing the mixture to a pH of 6.5–9, heating the mixture from 50°C to boiling to polymerize the mixture, acidifying the polymerized mixture to pH of 1–6, and precipitating the aminoresin-silica polymeric composite therefrom and recovering said precipitate as spheroidal shaped clusters of said composition, said composition containing from 0.5 to 30 percent silica by weight, the remainder being the aminoresin.

7. Process according to claim 6 in which the the amino is urea and the aldehyde is formaldehyde.

8. Process according to claim 6 in which the the amine is melamine and the aldehyde is formaldehyde.

9. Process according to claim 6 in which the the amine is thiourea and the aldehyde is formaldehyde.

10. Process according to claim 6 in which from 0.5 to 2.0 moles of formaldehyde are employed for each mole of amine.

11. Process according to claim 6 in which the product possesses a cluster size of from 1 to 10 $\mu$ with an individual particle size of from 0.05 to 0.3 $\mu$.

* * * * *